(12) United States Patent
Lee et al.

(10) Patent No.: US 10,259,306 B1
(45) Date of Patent: Apr. 16, 2019

(54) OBLIQUE MOTOR

(71) Applicants: Hyundai Motor Company, Seoul (KR); Kia Motors Corporation, Seoul (KR)

(72) Inventors: Jong Won Lee, Gyeonggi-do (KR); Kyoung Pyo Ha, Gyeonggi-do (KR); Key Chun Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/832,172

(22) Filed: Dec. 5, 2017

(30) Foreign Application Priority Data

Nov. 14, 2017 (KR) .......................... 10-2017-0151528

(51) Int. Cl.
*B60K 6/00* (2006.01)
*B60K 6/26* (2007.10)
*B60K 6/30* (2007.10)
*B60K 6/405* (2007.10)

(52) U.S. Cl.
CPC .................. *B60K 6/26* (2013.01); *B60K 6/30* (2013.01); *B60K 6/405* (2013.01); *B60K 2006/266* (2013.01)

(58) Field of Classification Search
CPC . B60K 6/26; B60K 6/30; B60K 6/405; B60K 6/36
See application file for complete search history.

(56) References Cited

U.S. PATENT DOCUMENTS

| | | | | |
|---|---|---|---|---|
| 5,229,738 A * | 7/1993 | Knapen | ................. | H01F 41/028 310/156.43 |
| 6,766,889 B1 * | 7/2004 | Pennycuff | .......... | B60K 17/3462 180/249 |
| 8,555,739 B2 * | 10/2013 | Ieda | ........................ | F16H 63/14 74/335 |
| 9,086,013 B2 * | 7/2015 | Franklin | ................. | F02B 53/00 |
| 2008/0099297 A1 * | 5/2008 | Iwashita | ............... | F16D 25/086 192/58.2 |
| 2015/0345110 A1 * | 12/2015 | Takeuchi | ............ | H01M 2/1083 180/65.21 |
| 2015/0352941 A1 * | 12/2015 | Tang | ........................ | B60K 6/36 74/6 |
| 2016/0099636 A1 * | 4/2016 | Fricasse | ................. | H02K 21/12 180/65.21 |

* cited by examiner

*Primary Examiner* — Hau V Phan

(74) *Attorney, Agent, or Firm* — Mintz Levin Cohn Ferris Glovsky and Popeo, P.C.; Peter F. Corless

(57) ABSTRACT

An oblique motor of a vehicle including an engine and a transmission includes a stator having a diameter formed to be smaller toward the engine; a rotor disposed inside the stator and having a diameter formed to be smaller toward the engine; a cooling member fixed to the stator and configured to cool heat generated from the stator; and a housing enclosing the cooling member and fixedly installed between the engine and the transmission.

5 Claims, 6 Drawing Sheets

US 10,259,306 B1

OBLIQUE MOTOR

CROSS-REFERENCE TO RELATED APPLICATION

This application claims the benefit of priority to Korean Patent Application No. 10-2017-0151528 filed in the Korean Intellectual Property Office on Nov. 14, 2017, the entire contents of which are incorporated herein by reference.

BACKGROUND OF THE DISCLOSURE

(a) Technical Field

The present disclosure relates generally to motors and, more particularly, to an oblique motor that may be directly coupled to a crankshaft.

(b) Description of the Related Art

A hybrid vehicle uses a combination of power from an internal combustion engine and power from a motor to propel the vehicle. Hybrid vehicles may be classified as a mild-type or a hard-type according to a power sharing ratio of the engine and the motor. A mild-type hybrid vehicle (hereinafter, referred to as a "mild hybrid vehicle") includes a mild hybrid starter & generator (MHSG) which starts the engine, instead of an alternator, and is generated by an output of the engine. The hard-type hybrid vehicle includes a hard hybrid starter & generator (HHSG) which starts the engine and is generated by the output of the engine, and also includes a drive motor which drives the vehicle.

The mild hybrid vehicle may assist the engine torque according to a running state of the vehicle using the MHSG. Also, the mild hybrid vehicle may charge a battery (e.g., 48 V battery) through a regenerative braking procedure. Accordingly, fuel consumption of the mild hybrid vehicle may be improved.

FIG. 1 is a view showing an engine of a conventional mild hybrid vehicle.

As shown in FIG. 1, a MHSG pulley 3 connected to a MHSG 2 and a damper pulley 4 connected to a crank shaft of an engine 1 are connected through a belt 5. A tension of the belt 5 may be controlled by a tensioner 6.

Problematically, a mounting space for the MHSG 2 to the engine 1 is separately required, and a power delivery efficiency of the MHSG 2 is deteriorated by the belt 5. Accordingly, ] the MHSG may be mounted at a space between the engine and the transmission. However, it is difficult to mount the MHSG between the engine and the transmission due to an interference with the drive shaft.

The above information disclosed in this Background section is only for enhancement of understanding of the background of the disclosure, and therefore it may contain information that does not form the related art.

SUMMARY OF THE DISCLOSURE

Accordingly, the present disclosure provides an oblique motor that may be directly coupled to a crankshaft to solve the above-described problems.

According to embodiments of the present disclosure, an oblique motor of a vehicle including an engine and a transmission includes: a stator having a diameter formed to be smaller toward the engine; a rotor disposed inside the stator and having a diameter formed to be smaller toward the engine; a cooling member fixed to the stator and configured to cool heat generated from the stator; and a housing enclosing the cooling member and fixedly installed between the engine and the transmission.

An engine-side diameter of the stator may be smaller than a transmission-side diameter of the stator.

An engine-side diameter of the rotor may be smaller than a transmission-side diameter of the rotor.

An engine-side diameter of the housing may be smaller than a transmission-side diameter of the housing.

The rotor may be integrally formed with a flywheel of the vehicle having a mounting part directly coupled to a center part of a crankshaft of the vehicle.

As described above, according to embodiments of the present disclosure, because the oblique motor is directly coupled to the crankshaft, the power delivery efficiency may be improved, the spatial utility of the engine compartment may be increased, and assembly costs may be reduced. Also, even if the oblique motor is disposed in a space between the engine and the transmission, interference with constituent elements of the drive shaft may be avoided.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

Figure 1:
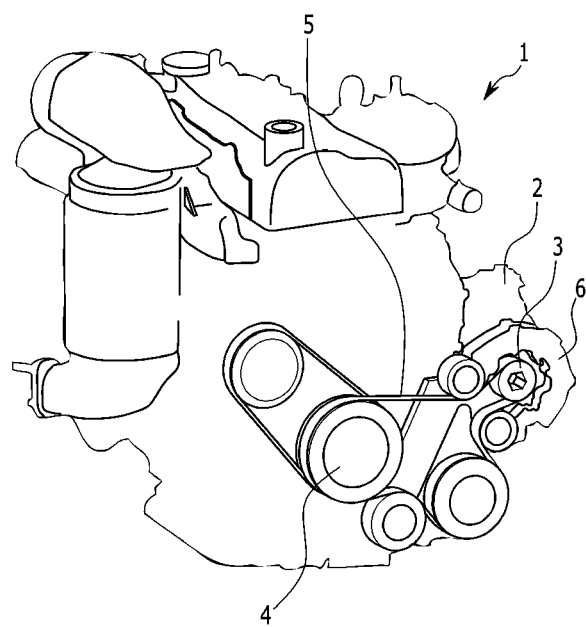
FIG. 1 is a view showing an engine of a conventional mild hybrid vehicle.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF SYMBOLS

10: engine
20: oblique motor
30: transmission
40: differential gear apparatus
50: wheel
60: drive shaft

DETAILED DESCRIPTION OF THE EMBODIMENTS

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

For the purpose of clear description of embodiments of the present disclosure, parts which are not related to the description are omitted. The same reference numbers are used throughout the specification to refer to the same or like parts. Further, each configuration shown in the drawings are illustrated for better understanding and ease of description at discretion of the designer, and the present disclosure is not limited to the drawings shown, necessarily.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
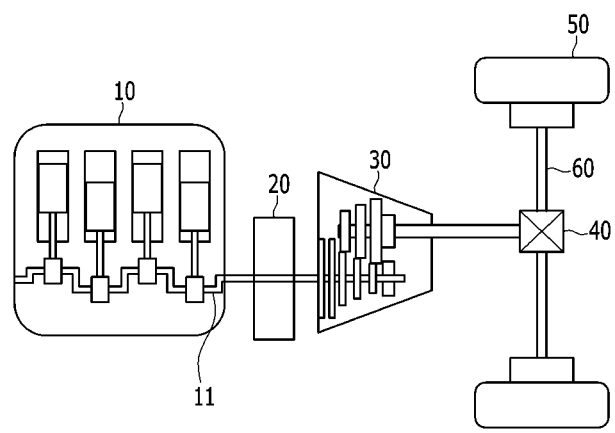
FIG. 2 is a view showing a mild hybrid vehicle according to embodiments of the present disclosure.

Referring now to the presently disclosed embodiments, FIG. 2 is a view showing a mild hybrid vehicle according to embodiments of the present disclosure.

As shown in FIG. 2, a mild hybrid vehicle according to embodiments of the present disclosure includes an engine 10, an oblique motor 20, a transmission 30, a differential gear apparatus 40, and a wheel 50.

In connection with a power delivery of the mild hybrid vehicle, torque generated from the engine 10 is delivered to an input shaft of the transmission 30, and the torque output from an output shaft of the transmission 30 is delivered to the drive shaft 60 through a differential gear apparatus 40. As the drive shaft 60 rotates the wheel 50, the mild hybrid vehicle runs by the torque generated from the engine 10.

The oblique motor 20 may start the engine 10 and may be generated by the output of the engine 10. Also, the oblique motor 20 may assist the torque of the engine 10. That is, the mild hybrid vehicle may use the torque of the oblique motor 20 as an assistance torque while using the torque of the engine 10 as a primary torque. The oblique motor 20 may be referred to as a mild hybrid starter & generator (MHSG).

Figure 3:
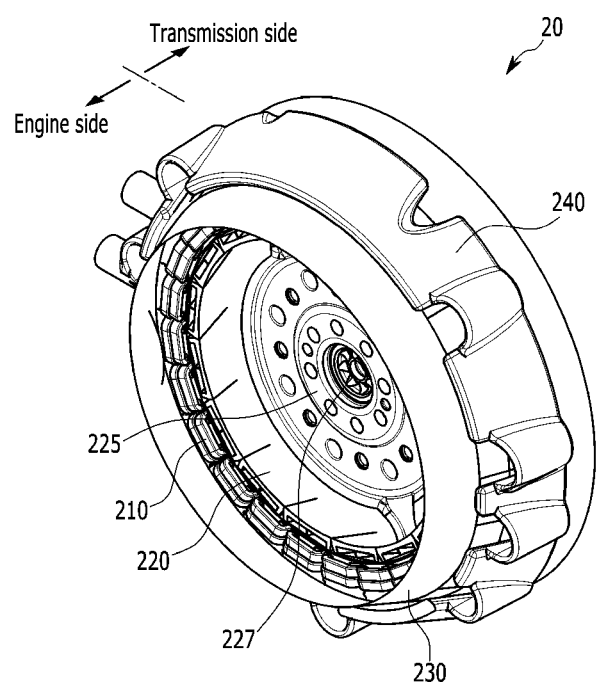
FIG. 3 is an exploded perspective view of an oblique motor according to embodiments of the present disclosure.
Figure 4:
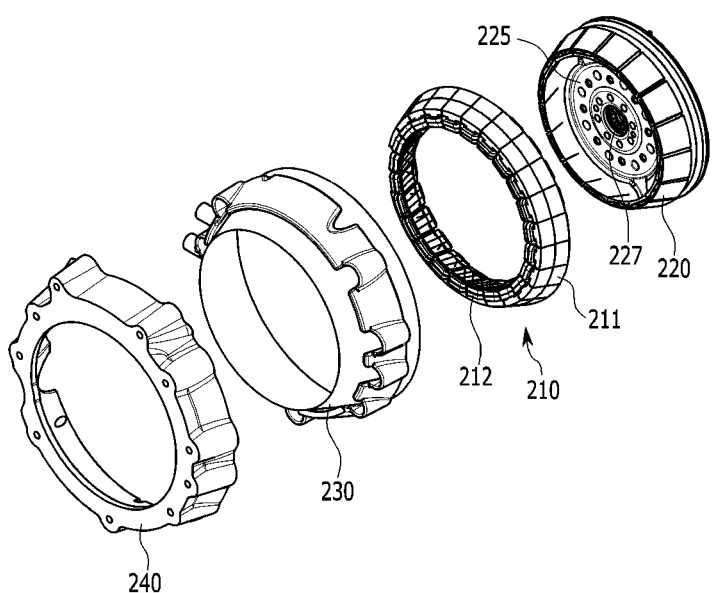
FIG. 4 is another exploded perspective view of an oblique motor according to embodiments of the present disclosure.
Figure 5:
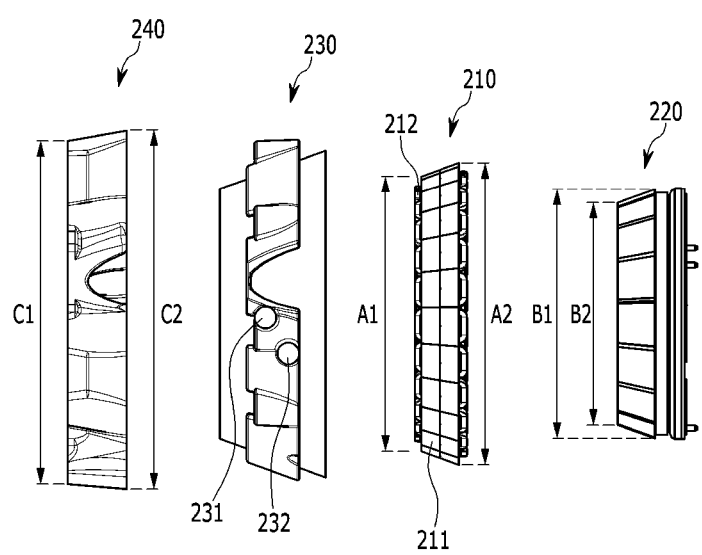
FIG. 5 is an exploded side view of an oblique motor according to embodiments of the present disclosure.

FIG. 3 is an exploded perspective view of an oblique motor according to embodiments of the present disclosure, FIG. 4 is another exploded perspective view of an oblique motor according to embodiments of the present disclosure, and FIG. 5 is a exploded side view of an oblique motor according to embodiments of the present disclosure.

As shown in FIGS. 3-5, the oblique motor 20 according to embodiments of the present disclosure includes a stator 210, a rotor 220, a cooling member 230, and a housing 240. The stator 210 generates a magnetic flux and the rotor 220 is disposed inside the stator 210 to be rotated.

The stator 210 includes a stator core 211 and a stator coil 212.

A plurality of slots 213 which are formed at an inner peripheral side of a stator core 211 and a stator coil 212 is wound in the slot 213. If a current is applied to the stator coil 212, the magnetic flux is generated in the stator 210 and the rotor 220 may generate the torque by the magnetic flux.

The stator 210 may be formed such that a diameter of the stator 210 decreases toward the engine 10. That is, an engine-side diameter A1 of the stator 210 is smaller than a transmission-side diameter A2 of the stator 210.

The rotor 220 is disposed inside the stator 210 ad may be integrally formed with a flywheel 225. The rotor 220 may include a permanent magnet or a rotor core of which the rotor coil is wound.

The flywheel 225 maintains the torque of the crankshaft 11 of the engine 10 and a mounting part 227 that is directly coupled to the crankshaft 11 at a center part. Since the rotor 220 is integrally formed with the flywheel 225 to be coupled to the crankshaft 11, a belt connect the engine 10 and the oblique motor 20 may be omitted and the power delivery efficiency of the oblique motor 20 may be improved.

The rotor 220 may be formed so as to decrease the diameter toward the engine 10. That is, the engine-side diameter B1 of the stator 220 is smaller than the transmission-side diameter B2 of the rotor 220.

The cooling member 230 fixes the stator 210 inside the housing 240 and simultaneously may cool a heat generated from the stator 210 through a cooling member (e.g., a coolant). Since a large amount of the heat is generated from the stator 210, cooling for preventing damage due to the heat and consistently securing a stable operability is necessary. An inflow hole 231 in which the coolant inflows and an outflow hole 232 outflowing the coolant may be formed on an exterior circumference of the cooling member 230, and a flow passage flowing the coolant may be formed inside the cooling member 230.

The housing 240 encloses the cooling member 230 and is installed to be fixed between the engine 10 and the transmission 30.

The housing 240 may be formed so that the diameter decreases toward the engine 10. That is, the engine-side diameter C1 of the housing 240 is smaller than the transmission-side diameter C2 of the housing 240.

Figure 6:
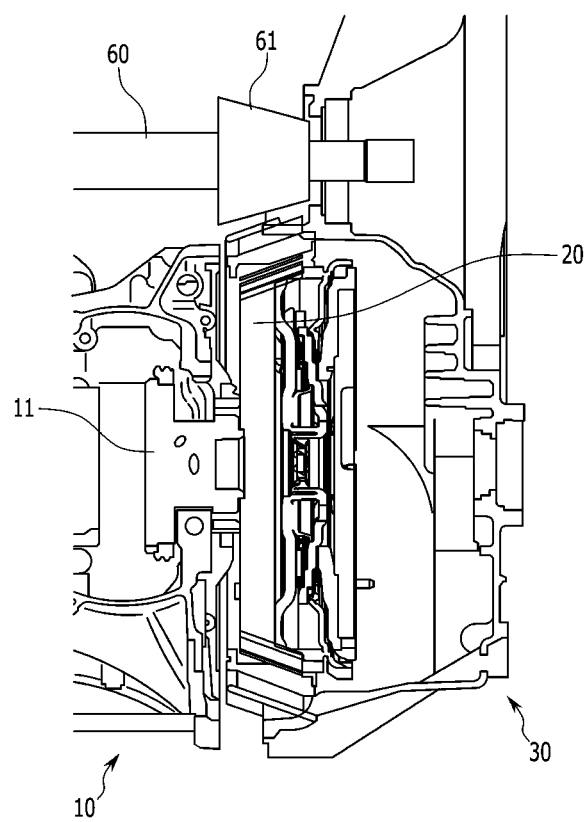
FIG. 6 is a view explaining an effect of an oblique motor according to embodiments of the present disclosure.

FIG. 6 is a view to explain an effect of an oblique motor according to embodiments of the present disclosure.

As shown in FIG. 6, as the distance between the drive shaft 60 and the crankshaft 11 gets closer, since the drivability is improved, the distance between the drive shaft 60 and the crankshaft 11 is determined within a predetermined distance. Conventionally, when mounting the motor directly coupled to the crankshaft 11, the interference is generated with constituent elements such as a boots 61 of the drive shaft 60 such that the motor is separately mounted in the mounting space and is connected to the crankshaft 11 through the belt.

However, because the diameter of the oblique motor 20 according to embodiments of the present disclosure is formed to be smaller toward the engine 10, interference with the constituent elements of the drive shaft 60 may be avoided. Accordingly, because the oblique motor 20 is directly coupled to the crankshaft 11 and the belt maybe omitted, the power delivery efficiency is improved, a spatial utility of the engine compartment may be increased, and a cost may be reduced.

While this disclosure has been described in connection with certain embodiments, it is to be understood that the disclosure is not limited to the disclosed embodiments, but, on the contrary, is intended to cover various modifications and equivalent arrangements included within the spirit and scope of the appended claims.

What is claimed is:

1. An oblique motor of a vehicle including an engine and a transmission, the oblique motor comprising:
   a stator having a diameter formed to be smaller toward the engine;
   a rotor disposed inside the stator and having a diameter formed to be smaller toward the engine;
   a cooling member fixed to the stator and configured to cool heat generated from the stator; and
   a housing enclosing the cooling member and fixedly installed between the engine and the transmission.

2. The oblique motor of claim 1, wherein:
   an engine-side diameter of the stator is smaller than a transmission-side diameter of the stator.

3. The oblique motor of claim 1, wherein:
   an engine-side diameter of the rotor is smaller than a transmission-side diameter of the rotor.

4. The oblique motor of claim 1, wherein:
   an engine-side diameter of the housing is smaller than a transmission-side diameter of the housing.

5. The oblique motor of claim 1, wherein:
   the rotor is integrally formed with a flywheel of the vehicle having a mounting part directly coupled to a center part of a crankshaft of the vehicle.

\* \* \* \* \*